US009532317B2

(12) United States Patent
Backholm et al.

(10) Patent No.: US 9,532,317 B2
(45) Date of Patent: Dec. 27, 2016

(54) OPTIMIZING TRAFFIC BY CONTROLLING KEEP-ALIVES

(71) Applicant: Seven Networks, LLC, Marshall, TX (US)

(72) Inventors: Ari Backholm, San Carlos, CA (US); Andrii Kokhanovskyi, Kiev (UA); Michael Fleming, San Carlos, CA (US); Sungwook Yoon, San Carlos, CA (US)

(73) Assignee: Seven Networks, LLC, Marshall, TX (US)

( * ) Notice: Subject to any disclaimer, the term of this patent is extended or adjusted under 35 U.S.C. 154(b) by 152 days.

(21) Appl. No.: 14/500,241

(22) Filed: Sep. 29, 2014

(65) Prior Publication Data

US 2015/0016342 A1 Jan. 15, 2015

Related U.S. Application Data

(63) Continuation of application No. PCT/US2014/040575, filed on Jun. 2, 2014.

(60) Provisional application No. 61/829,969, filed on May 31, 2013.

(51) Int. Cl.
*H04W 52/28* (2009.01)
*H04W 52/26* (2009.01)
*H04W 4/00* (2009.01)
*H04W 52/22* (2009.01)
*H04W 24/08* (2009.01)
*H04L 12/823* (2013.01)

(52) U.S. Cl.
CPC ............ *H04W 52/267* (2013.01); *H04L 47/32* (2013.01); *H04L 47/323* (2013.01); *H04W 4/008* (2013.01); *H04W 24/08* (2013.01); *H04W 52/228* (2013.01)

(58) Field of Classification Search
CPC .... H04W 52/267; H04W 52/26; H04W 52/22; H04W 24/08; H04W 52/228; H04W 4/008; H04W 76/04; H04W 76/045; H04L 47/32; H04L 47/323
See application file for complete search history.

(56) References Cited

U.S. PATENT DOCUMENTS

| | | | |
|---|---|---|---|
| 6,212,175 | B1 | 4/2001 | Harsch |
| 6,693,919 | B1 | 2/2004 | Kameyama |
| 6,715,082 | B1 | 3/2004 | Chang |
| 7,406,087 | B1 | 7/2008 | Quach et al. |
| 8,731,542 | B2 | 5/2014 | Tervahauta et al. |

(Continued)

FOREIGN PATENT DOCUMENTS

| | | |
|---|---|---|
| KR | 20100085240 A | 7/2010 |
| WO | 2011134495 A1 | 11/2011 |
| WO | 2012121784 A2 | 9/2012 |

OTHER PUBLICATIONS

Non-Final Office Action mailed Jan. 7, 2015 for application No. 14283193.

(Continued)

*Primary Examiner* — Ian N Moore
*Assistant Examiner* — Lakeram Jangbahadur
(74) *Attorney, Agent, or Firm* — NK Patent Law, PLLC

(57) ABSTRACT

A system, method and non-transitory computer code for operating a proxy server operating under software to cause the proxy server to access a communication network and to delay, advance or block keep-alives for a client device to improve traffic data flow.

6 Claims, 4 Drawing Sheets

(56) References Cited

U.S. PATENT DOCUMENTS

| | | |
|---|---|---|
| 8,799,410 B2 | 8/2014 | Fiatal |
| 8,838,744 B2 | 9/2014 | Fiatal |
| 2003/0157947 A1 | 8/2003 | Fiatal et al. |
| 2004/0068665 A1 | 4/2004 | Fox et al. |
| 2005/0071674 A1 | 3/2005 | Chou |
| 2005/0188098 A1* | 8/2005 | Dunk ............... H04L 67/14 709/232 |
| 2006/0092841 A1 | 5/2006 | Lloyd |
| 2006/0182141 A1 | 8/2006 | Duggirala et al. |
| 2006/0190569 A1 | 8/2006 | Neil |
| 2007/0019610 A1 | 1/2007 | Backholm |
| 2007/0140193 A1 | 6/2007 | Dosa et al. |
| 2007/0288469 A1 | 12/2007 | Shenfield |
| 2008/0022336 A1 | 1/2008 | Howcroft |
| 2008/0039032 A1 | 2/2008 | Haumont |
| 2008/0115152 A1 | 5/2008 | Welingkar et al. |
| 2008/0307100 A1 | 12/2008 | Duggirala et al. |
| 2009/0122699 A1 | 5/2009 | Alperovitch et al. |
| 2009/0149203 A1 | 6/2009 | Backholm et al. |
| 2010/0124211 A1 | 5/2010 | Payyappilly |
| 2011/0280134 A1 | 11/2011 | Zheng |
| 2012/0135726 A1* | 5/2012 | Luna ............... H04W 12/06 455/422.1 |
| 2012/0176968 A1 | 7/2012 | Luna |
| 2012/0185597 A1 | 7/2012 | Luna |
| 2012/0254401 A1 | 10/2012 | Adams et al. |
| 2013/0060815 A1 | 3/2013 | Saeki |
| 2013/0132941 A1 | 5/2013 | Lindeman et al. |
| 2013/0142050 A1 | 6/2013 | Luna |
| 2014/0280892 A1 | 9/2014 | Reynolds et al. |

OTHER PUBLICATIONS

USPTO, Non-Final Rejection for U.S. Appl. No. 15/051,609, mailed on Apr. 13, 2016.
USPTO non-final Office Action mailed Jun. 12, 2015 for U.S. Appl. No. 14/468,282 and Notice of References Cited.
USPTO non-final Office Action mailed Jun. 22, 2015 for U.S. Appl. No. 14/266,759 and Notice of References Cited.
IPRP for Application No. PCT/US2014/036262 dated Sep. 24, 2014.
USPTO non-final Office Action mailed Oct. 8, 2015 for U.S. Appl. No. 14/266,759 and Notice of References Cited.
USPTO Final Office Action mailed Nov. 10, 2015 for U.S. Appl. No. 14/468,282 and Notice of References Cited.
IPRP for Application No. PCT/US2014/036669 dated Sep. 29, 2014.
IPRP for Application No. PCT/US2014/040575 dated Oct. 2, 2014.
IPRP for Application No. PCT/US2014/042006 dated Oct. 16, 2014.
USPTO, Notice of Allowance for U.S. Appl. No. 14/662,161, mailed on Aug. 2, 2016.
USPTO, Notice of Allowance for U.S. Appl. No. 15/051,609, mailed Oct. 28, 2016.
USPTO, Notice of Allowance for U.S. Appl. No. 15/079,089, mailed Oct. 7, 2016.
USPTO, Notice of Allowance for U.S. Appl. No. 15/079,089, mailed Sep. 6, 2016.
USPTO, Notice of Allowance for U.S. Appl. No. 14/662,161, mailed Sep. 6, 2016.

* cited by examiner

OPTIMIZING TRAFFIC BY CONTROLLING KEEP-ALIVES

CROSS-REFERENCE TO RELATED APPLICATIONS

This application is a continuation application of PCT Patent Application No. PCT/US14/40575 filed on Jun. 2, 2014 and entitled "OPTIMIZING TRAFFIC BY CONTROLLING KEEP-ALIVES", which claims priority to U.S. Provisional Patent Application No. 61/829,969 which was filed on May 31, 2013, entitled, "Intelligent Alignment of Keep-Alive Messages Through Delays, Advances, Or Blocking To Optimize Non-User-Interactive Traffic In Mobile Networks For Traffic Management," the entire content of which is hereby incorporated by reference.

TECHNICAL FIELD

This disclosure relates to communication system protocols. More particularly, it is directed to mobile communication system architectures that efficiently process keep-alive messages for both standard communication protocols (such as HTTP or HTTPS) and non-standard communication protocols.

BACKGROUND

Modern data communications are usually based on the client-server model. In that model a client, such as a web browser submits messages to servers dedicated to perform certain functions. Those servers provide resources to process messages, to send messages over a communication link, to service the messages, to receive return messages, to process the returned message, and then to submit the returned message to the client. This client-server model works very well, at least in part because the client, the servers, the communication network, intermediate entities, and the messages all follow standardize sets of rules. Individual entities can be designed independently based only on the requirements of that entity's set of rules.

Extending the client server model is the concept of proxies. A proxy is a device, system, or application that acts as an intermediary for handling requests from a client for resources such as a file or a web page or access to a network. One of the most useful proxies is the so-called proxy server, which is a computer system (or an application that runs on a computer system) that acts as an intermediary for requests from various clients that want services from other entities. A middle manager of sorts that receives data and passes it along as required. A proxy server may be a local proxy, which implies that the proxy server is in the same domain as the client, or a remote server which implies it is not in the same domain.

Also extending the client server model are standard communication protocols such as the Hypertext Transfer Protocol (HTTP), the Hypertext Transfer Protocol Secure (HTTPS), the File Transfer Protocol (FTP), the Simple Mail Transfer Protocol (SMTP), the Internet Message Access Protocol (IMAP), the Post Office Protocol (POP), and the like. While these and other standard protocols have proven to be very flexible and highly useful they may not be optimal in all applications. For example, in some mobile data communication systems non-standard protocols may provide better data feed-through.

Many mobile applications are moving away from standard protocols and towards vendor specific proprietary protocols that can improve data communications using the vendor's products. For example, Google utilizes a non-standard Transmission Control Protocol (TCP) port 5228 while the "WhatsApp" mobile application uses a customized version of the Extensible Messaging and Presence Protocol (XMPP). Other applications such as Skype and Yahoo mail use their own proprietary protocols while others such as Urban Airship's push notifications protocol is used by various vendors.

While standard and custom protocols have both proven highly useful, each protocol still must pass over a distributed system of local proxy and/or proxy servers as a data stream. Such distributed systems almost always implement the Transmission Control Protocol (TCP). TCP produces an ordered, error-checked data stream of octets that pass between programs and computers connected to a network.

One major concern of modern communication system architectures is time. Data transmissions from a client over a local proxy servers to the next server to the next and finally to a host proxy server which services the request takes time. Responding to a query also takes time. Returning the response to the client takes more time. Meanwhile the network is handling the traffic of other users. Once a message is sent, a client cannot know that the link between itself and the host proxy server remains intact. Any failure in the communication link conceivably would leave the sending browser waiting for a response that will never come. This is a very serious problem in mobile communication networks since mobile devices change links as they move from one location (cell) to another.

A common solution to the foregoing is to ensure that the communication link remains viable by incorporating "keep-alives" or "heartbeats." A "keep-alive" is a short message sent between devices to verify that the communication link between them is intact. In some systems "keep-alives" actually do keep the link open since if a keep-alive message does not occur in a given period of time the links will self-break to avoid hanging up and to re-establish communications. Unfortunately the actual content and format of keep-alive messages depends on the specific communication protocol that is being used. While a client will recognize it's keep-alive on a mobile network and can send its "correct" keep-alive, intermediate proxy servers may not. Thus in the prior art, intermediate proxy servers had to simply pass on all messages. This increased congestion and caused traffic delays for non-clients.

Maintaining link integrity is particularly important when using mobile devices such as cell phones. The reason for that is that mobile devices are "handed" off from one cell to another as the mobile devices move. Communication link changes are common and the proper functioning of each new cell link is important.

The importance of keep-alives and the fact that keep-alive content and form depend on the communication protocol being used makes protocol agnostic system architectures highly desirable. One simply wants a system architecture that can handle anything. Thus, a system architecture that is protocol agnostic would be very useful. Preferably such protocol agnostic system architectures would support data traffic optimization in a wireless network. Ideally such protocol agnostic system architectures would support data traffic optimization using intelligent keep-alives which can be delayed or advanced and/or blocked to enable improved non-client interactive traffic in a mobile network.

SUMMARY

This Summary introduces inventive concepts in a simplified form that are further described subsequently. This Summary is not intended to be used to limit the scope of the claimed subject matter.

A traffic managing network that is in accord with the present invention includes a mobile device connected by a mobile data link to a proxy server that operates under server software that causes the proxy server to manage mobile data to reduce congestion.

A computerized system that is in accord with the present invention includes a communication network; a proxy server operating under software that causes the proxy server to access the communication network; a client device in communication with the proxy server over the communication network with the client device operating under an application that sends keep-alives to the proxy server and receives incoming keep-alives from the proxy server; and a non-client device in communication with the proxy server with the non-client device sending and receiving traffic from the proxy server. The proxy server manipulates incoming keep-alives to improve the flow of the non-client traffic.

In practice the computerized system may blocks incoming keep-alives, particularly if the incoming keep-alive is unnecessary. If so, the computerized system beneficially unblocks incoming keep-alives if they are necessary. The computerized system may also delay incoming keep-alives. Preferably such a delay does not exceed the maximum keep-alive delay tolerance of the mobile device. Delays can also be based on a delay timer. Preferably the proxy server is a local proxy server.

A processor controlled method of processing heartbeats that is in accord with the present invention intercept a heartbeat meant for a mobile device. The proxy server then determines if the mobile device is powered up. If so, the intercepted heartbeat is sent to the mobile device. If not powered up, the intercepted heartbeat is stored in a Heartbeat delay pool buffer. Beneficially, the heartbeats in the Heartbeat delay pool buffer are sent when a timer fires. Preferably that timer fires within the minimum required time of all of the heartbeats in the Heartbeat delay pool buffer.

In accord with another embodiment of the present invention is non-transitory computer readable media containing computer code to implement a system for causing a proxy server to access a communication network; causing the proxy server to receive keep-alives for a client device; and causing the proxy server to process non-client traffic; wherein the proxy server manipulates keep-alives to improve the flow of the non-client traffic. The non-transitory computer readable media may cause the proxy server to block keep-alives or to delays incoming keep-alives.

BRIEF DESCRIPTION OF THE DRAWINGS

The foregoing summary as well as the following detailed description is better understood when read in conjunction with the appended drawings. For purposes of illustration the drawings show an exemplary embodiment; however, the presently disclosed subject matter is not limited to the specific embodiment, methods and instrumentalities disclosed. In the drawings.

DETAILED DESCRIPTION

The presently disclosed subject matter is described more fully hereinafter with reference to the accompanying drawings in which one embodiment of a traffic managing network 10 that is in accord with the present invention is shown. That traffic managing network 10 operates in accord with one or more computer programs, either non-transitory software or firmware, that is available on computer-readable media and which is executed by one or more computers or other processor controlled systems such as servers.

In the figures like numbers refer to like elements throughout. Additionally, the terms "a" and "an" as used herein do not denote a limitation of quantity, but rather denote the presence of at least one of the referenced items. Any directional signal such as top, bottom, left, right, upper and lower are taken with reference to the orientation in the various figures.

As referred to herein, the terms "server, processor, computer and network should be broadly construed. A server, processor, computer and network includes any processor-based device having memory suitable for receiving code from non-transitory computer readable media for implementing the subsequently disclosed traffic managing network 10. In addition, as the traffic managing network 10 includes a mobile device such devices should also be broadly construed. A mobile device may be a Smartphone, a cell phone, a pager, a personal digital assistant (PDA), a mobile computer with a Smartphone client, a tablet computer or the like.

The traffic managing network 10 makes uses of mobile data communications. Such data communications may be performed by either a wireless data access-enabled mobile device (e.g., an iPHONE® Smartphone, a BLACKBERRY® Smartphone, a NEXUS ONE™ Smartphone, an iPAD® device, or the like) capable of sending and receiving data using protocols like the Internet Protocol and the wireless application protocol, or WAP, as well as proprietary protocols. Wireless data access should be understood as being supported by wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies as supported by operating systems such as PalmOS, EPOC, Windows CE, FLEXOS, OS/9, JavaOS, iOS and Android. Data communications may be made using many different message transfer techniques including SMS (short message service), enhanced SMS (EMS), multi-media message (MMS), email WAP, paging, or other known or later-developed wireless data formats.

The traffic managing network 10 intelligently manages keep-alives by dropping unneeded keep-alive, by delays keep-alives, or by advances keep-alives in a manner that optimizes non-client interactive traffic across a mobile network.

Figure 1:
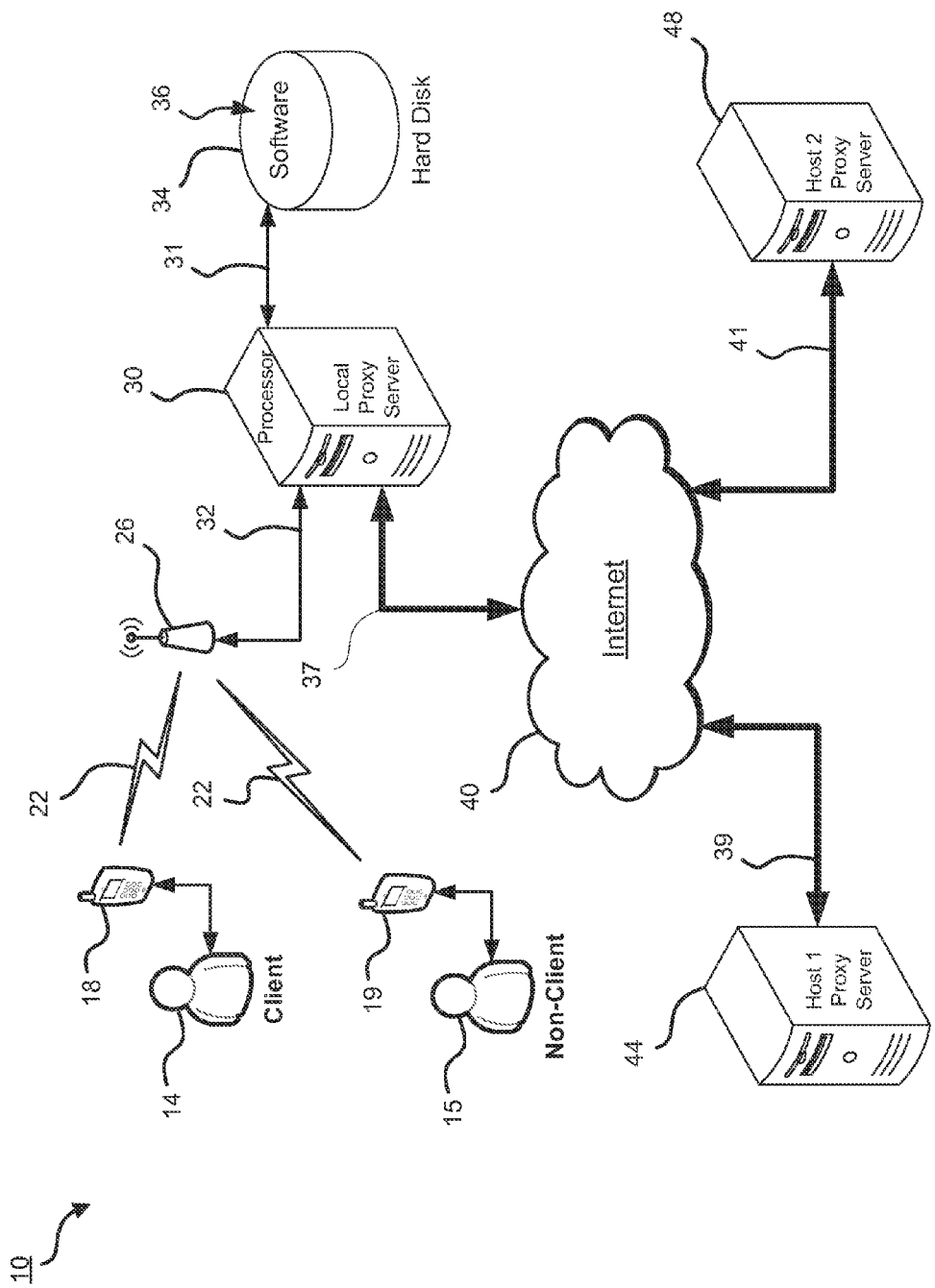
FIG. 1 illustrates an exemplary traffic managing network 10 practicing the present invention.

FIG. 1 illustrates an exemplary traffic managing network 10. The traffic managing network 10 operates in accord with computer programmable code to optimize non-client interactive traffic. The traffic managing network 10 includes a client 14 that operates a wireless device 18. While the wireless device 18 is shown as a cell phone in practice it could any one of a number of processor-controlled devices. The wireless device 18 implements a TCP data stream in accord with an internal application.

The wireless device 18 communicates the TCP data stream over a wireless communication system 26 using radio signals 22. The wireless communication system 26 should be understood as including a network of cellular towers, internet links, routers, phone lines, microwave towers, and/or other communication facilities as needed to implement its purpose. The wireless communication system 26 then communicates with a local proxy server 30 via link 32. The local proxy server 30 should be understood as being in the same domain as the wireless communication system 26 and the wireless device 18.

The traffic managing network 10 also includes a non-client 15 that operates another wireless device 19. Again, the wireless device 19 may be any one of a number of processor-controlled devices. The wireless device 19 also implements a TCP data stream in accord with its internal application. Significantly the wireless device 19 TCP data stream may implement a different, possibly a proprietary, communication protocol than the wireless device 18 TCP data stream. The wireless device 19 also communicates over the wireless communication system 26 using radio signals 22 and its data stream is also sent to the local proxy server 30.

The local proxy server 30 runs in accord with software 36 stored on a non-transitory data storing hard disk 34. The hard disk 34 applies the software 36 to the local proxy server 30 via buss 31.

The local proxy server 30 connects to the internet 40 by a link 37. The internet 40 provides communications with a host of other proxy servers such as Host 1 Proxy Server 44 via link 39 and Host 2 Proxy Server 48 via link 41.

In operation the client 14 uses the mobile device 18 to obtain a service from, in this example, the Host 1 Proxy Server 44. The mobile device 18 formulates a request for the service using a protocol and then sends that request for a service via radio signals 22 across the wireless communication system 26. The wireless communication system 26 forwards the request to the local proxy server 30. The local proxy server 30, operating under the direction of software 36 forwards that request over the internet 40 to the Host 1 Proxy Server 44 which will service the request. At this time, the local proxy server 30, the wireless communication system 26, the internet, and the Host 1 Proxy Server 44 are also handling other traffic. That other traffic may include keep-alives, non-client-interactive traffic and (c) client-interactive traffic.

Still referring to FIG. 1, the internet 40 routes the request for service to the Host 1 Proxy Server 44. While waiting for the service to be received or sent the mobile device 18 and the Host 1 Proxy Server 44 may send keep-alives to keep-alive the links between the Host 1 Proxy Server 44 and the mobile device 18, to ensure that the connection between the two is still valid, and to terminate the connection if the link is broken.

The Host 1 Proxy Server 44 then provides the service, which as appropriate is passed across the internet 40 and the wireless communication system 26 to the wireless device 18.

The traffic managing network 10 controls the keep-alives to improve non-client 15 traffic. Since most keep-alives are not needed at a particular instant of time, the traffic managing network 10 controls the passage of unnecessary keep-alives by blocking them, delaying them, or advancing them as required to improve non-client 15 traffic. The manner of doing this is presented in operation 200 shown in FIGS. 2A and 2B.

Figure 2A:
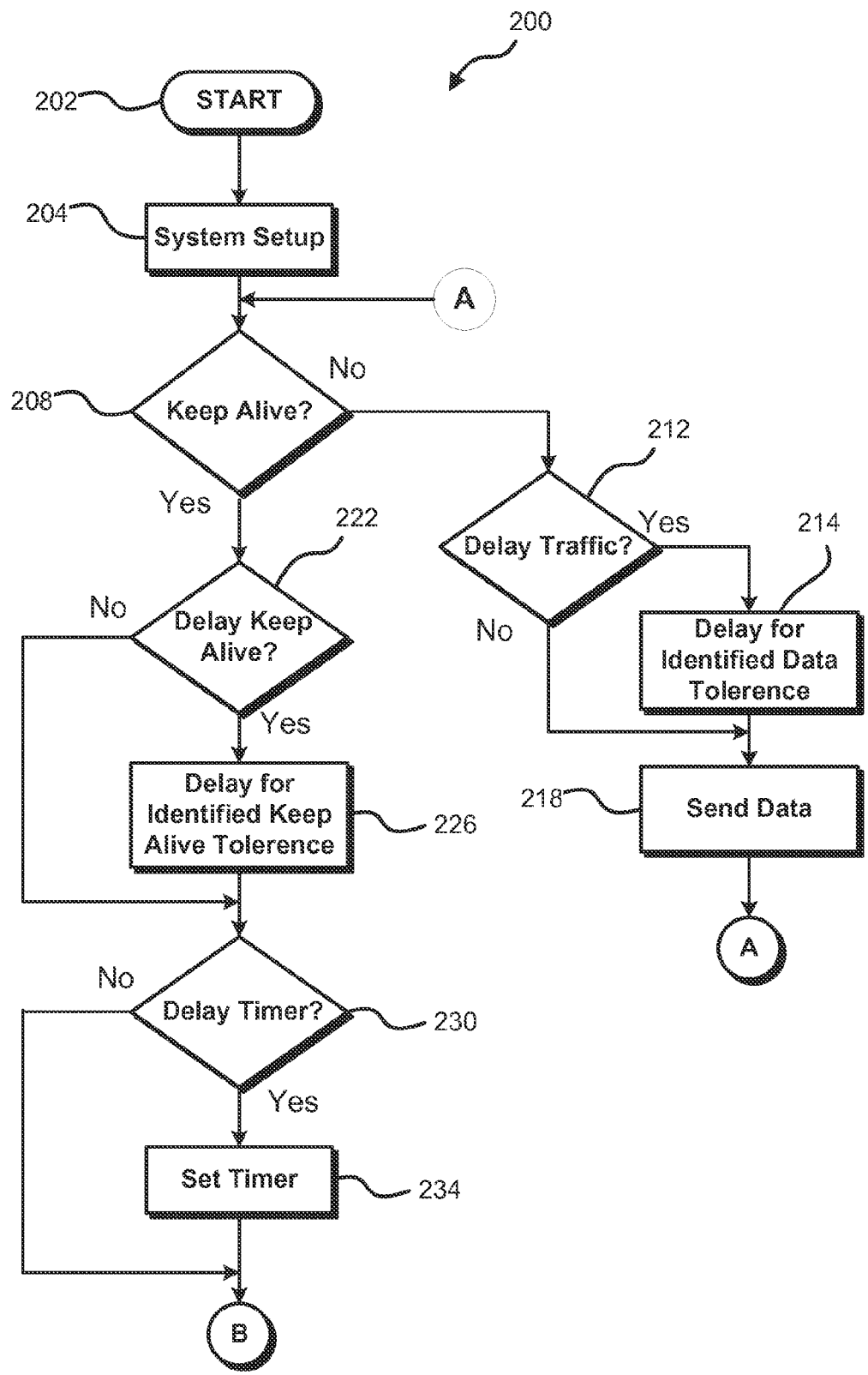
FIG. 2A presents a flow chart of part of the overall operation 200 of the traffic managing network 10.

Turning now to FIG. 2A, the operation 200 starts at step 202 and proceeds with a system set-up at step 204. The system set-up 204 is an on-going activity designed to assist subsequent steps. For example, the traffic managing network 10 distinguishes between keep-alive and non-keep-alive traffic. One way of doing this is to identify the particular protocol in the TCP data stream. Once that protocol is known, then the keep-alives in that protocol are specified and thus that protocol's keep-alives are easily identified.

As another example, step 204 can identify delay tolerances of keep lives and non-client-data traffic. Delay tolerances exist because different applications have varying tolerances to waiting for responses to transactions they send out. Algorithms exist to detect the delay tolerance for a given combination of application/protocol/TCP/UDP port. Those algorithms gradually increasing delays for the combination until the application times out and closes the socket or retries the request. Some algorithms also delay until the application's retry interval becomes longer than a specified threshold.

Step 204 can also use pre-defined knowledge of the importance of specific content types such as log uploads from the application. Since those logs are not time critical, longer delay tolerances are acceptable.

Thus the System Set up in step 204 should be understood as an on-going attempt by the traffic managing network 10 to obtain information regarding keep-alives and their requirements. From step 204, the traffic managing network 10 makes a determination if data in the TCP data stream is a keep-alive at step 208. To do so the traffic managing network 10 must distinguish between keep-alives, non-client-interactive traffic, and client-interactive traffic. Keep-alives can be identified by the local proxy server 30 based on a combination of parameters. Those parameters include periodicity of the traffic, size thresholds, similar/repeating content in the traffic, and/or on knowledge of the actual application level protocol obtained in step 204. Keep-alives are periodic, usually small, usually have repeating content and are well-defined in various protocols and are thus easily identifiable.

Non-keep-alive traffic can be distinguished by either not being keep-alives or as having content associated with data transferance containing data related to output mechanisms such as screen, audio, notification LED, Bluetooth, NFC, RFID, touch sensor, any other types of sensors, camera, etc, and readings from the any other sensors or detectors of the device, such as microphone, accelerometer, biosensors, location sensors, motion sensors, etc.

If traffic in the TCP data stream is not a keep-alive, a determination is made as to whether that traffic should be delayed at step 212. If the traffic managing network 10 is not congested at the local proxy server 30, the answer will be NO and the data will be sent at step 218. However, if the traffic managing network 10 is congested at the local proxy server 30, the data will be delayed for no longer than the indentified data delay tolerance determined in step 204 or until the congestion is reduced at step 214. Then, the data is sent at step 218. After step 218 operation 200 returns to step 208.

If in step 208, the determination is that the data in the TCP data stream is a keep-alive, a decision is made whether to delay the keep-alive at step 222. If the traffic managing network 10 is not congested at the local proxy server 30 the answer will be NO and the keep-alive and system operation continues to step 230. However, if the traffic managing network 10 is congested at the local proxy server 30 the keep-alive will be delayed for up to the indentified keep-alive delay tolerance determined in step 204 or until the congestion is reduced, step 226.

After step 226, or if the keep-alive is not to be delayed per step 222, operation 200 proceeds to step 230. At step 230, a determination is made whether to delay based on a keep-alive timer (if possible). Many applications utilize operating system libraries in network communications. These libraries often provide timer mechanisms in which an application can request a time out after some period of time (example, 60 seconds). By modifying those libraries, timeouts can be altered by the local proxy server 30 to make the application not time out, and thus extend the delay beyond what the application requested. If the timer is to be delayed, the timer is set, step 230. If the timer is not to be used for delay in step 230, or after the timer is set in step 234, the operation 200 proceeds to step 238.

Figure 2B:
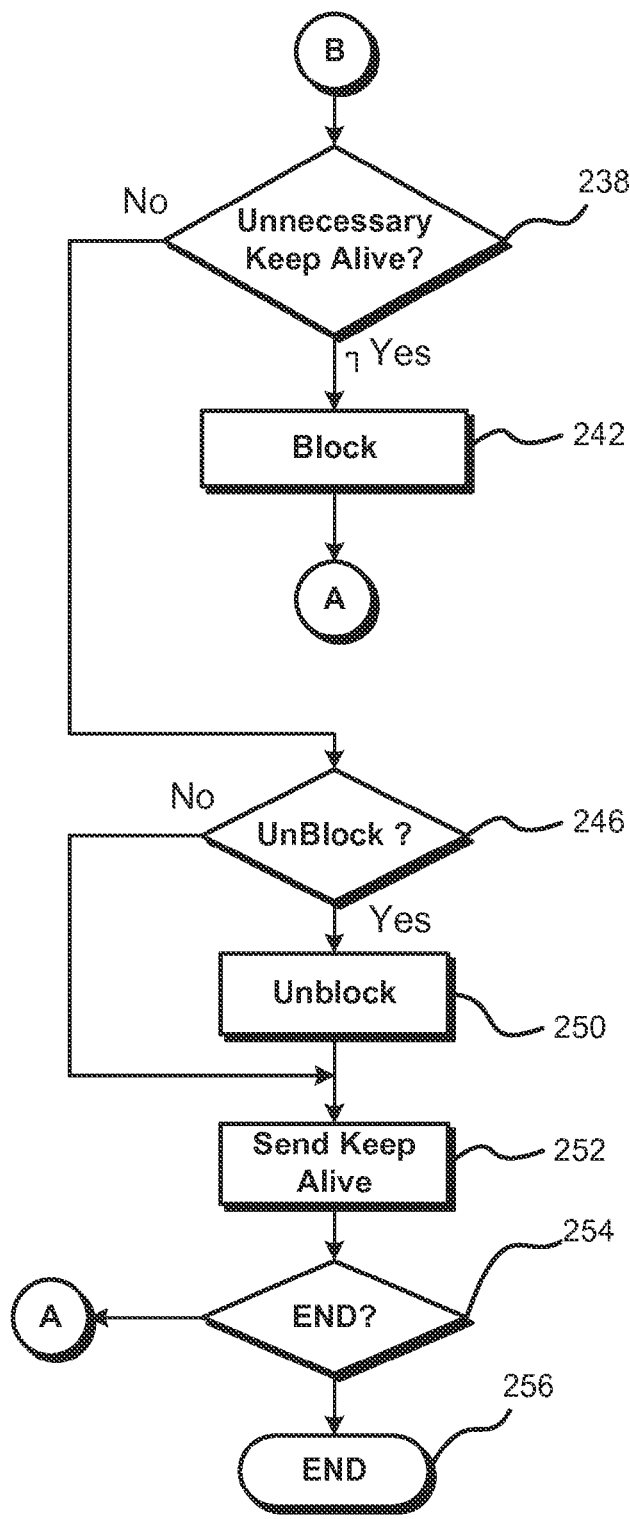
FIG. 2B presents a flow chart of the overall operation 200 of the traffic managing network 10 not shown in FIG. 2A.

Turning now to FIG. 2B, in step 238 the operation determines if the keep-alive is unnecessary. A keep-alive is unnecessary if there has been client activity in the TCP stream before the next keep-alive is required. Since keep-alives may be part of payload data, any client activity after data delivery is an indication that an earlier keep-alive occurred and the pending keep-alive may not be necessary. Another keep-alive that is unnecessary would be one pending when the timer is reset in step 234. Yet another unnecessary keep-alive is one that occurs after the application has moved to the background. If the pending keep-alive is unnecessary, keep-alives are blocked at step 242. Operation then returns to step 208.

However, if the keep-alive is necessary in step 238, operation 200 proceeds to step 246 where at determination is made whether to unblock keep-alives. This will be the case when the condition that caused the determination that prior keep-alives were not necessary no longer exists. In that case the block is removed, step 250. In either event since the pending keep-alive is necessary the pending keep-alive is sent, step 252. A decision then made whether to end the operation 200, step 254. If so, the operation 200 is ended, step 256. If not, operation returns to step 208.

Figure 3:
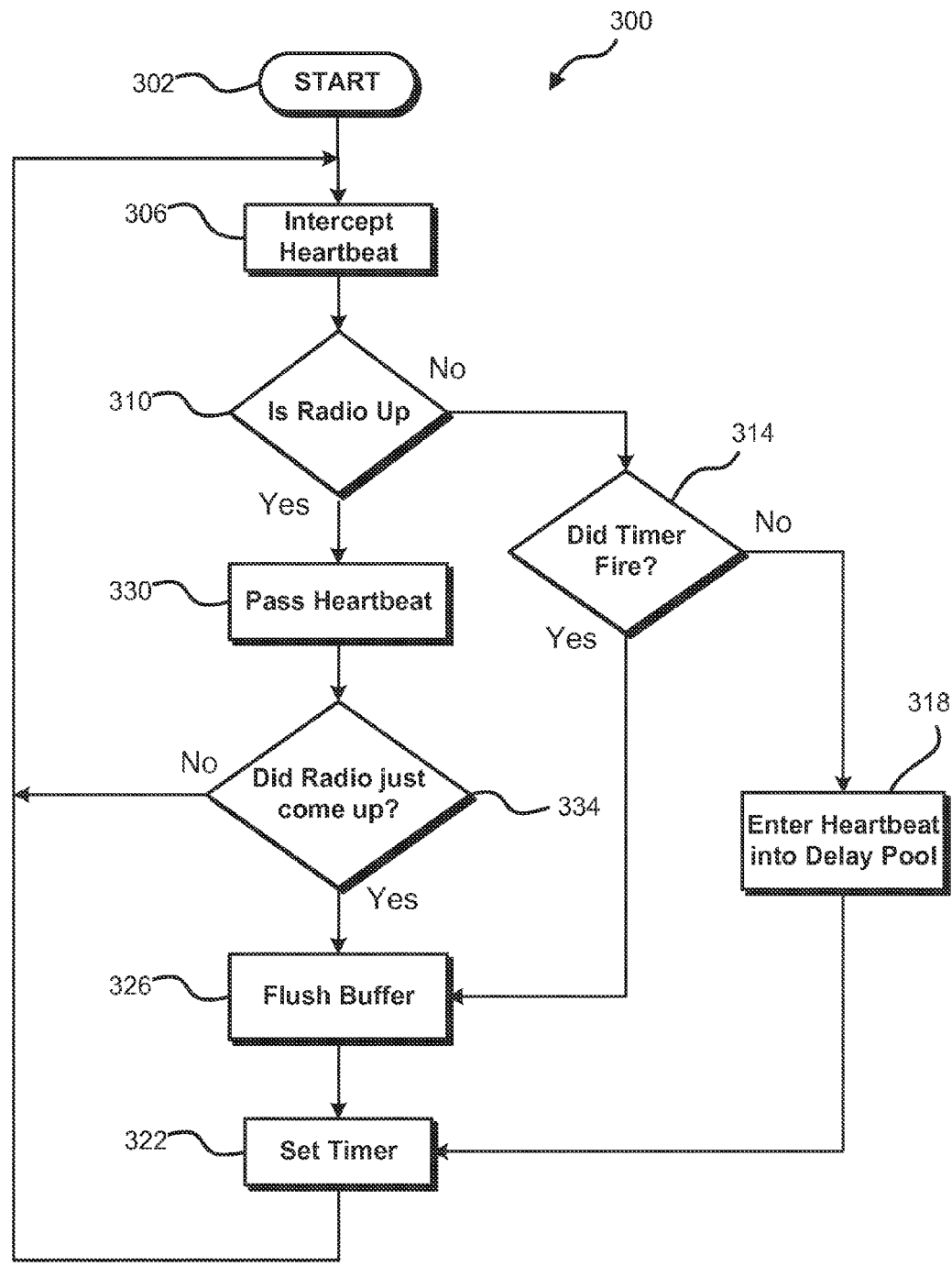
FIG. 3 presents a flow chart of the traffic managing network 10 configured to implement only keep-alive delays.

The foregoing operation 200 provides maximum flexibility when practicing the present invention. However, it is not always necessary. FIG. 3 illustrates a somewhat simplified operation 300 that is suitable for use in the traffic managing network 10. The operation 300 is based solely on delaying keep-alives which are referred to in operation 300 as heartbeats. A heart beat may be a regular keep-alive or a synthetic keep-alive. A heartbeat can be created and sent earlier than the application would normally send them. Heartbeats also can be sent out later than normal; they can be sent based on observed radio-up patterns, or based on a pre-defined threshold. Beneficially such a threshold is set such that keep-alives are not sent more frequently than statistically necessary. It should be understood that synthetic keep-alives may cause link breaks as checksums between the entities may not match. In such cases the application will usually re-establish connection and host servers are designed to resend the lost data.

Operation 300 is opportunistic, lazy, and local. That is, operation 300 makes use of the mobile device 18 if it is available. Heartbeats are not intentionally skipped. If the mobile device is not available operation 300 waits as long as possible before bringing the radio up without disrupting the client-server communication. That is, heartbeats are not advanced. Finally, operation 300 does not require any information/predictions about future events or their timing.

Turning to FIG. 3, the operation 300 starts, step 302 and proceeds by intercepting a heartbeat, step 306. A determination is then made as to whether the mobile device is up (radio up), step 310, If yes, the heartbeat is passed, step 330. If the mobile device 18 is not up operation 300 attempts to delay as long as possible. This is performed by advancing to step 314 where a determination is made whether a timer (set subsequently) has fired by timing out. If yes, delaying the heartbeat is not acceptable so all heartbeats in a delay pool buffer (see below) are flushed and sent out, step 326. Then the timer is set to fire within the shortest time horizon in the delay pool buffer.

But if in step 314 the timer has not fired, operation passes to step 318 where the heartbeat is added to a delay pool buffer. That just added heartbeat has an associated time in which it must fire or risk harming communications. After step 318 the timer is set to fire within the shortest time horizon in the delay pool buffer, step 322. In this manner heartbeats are delayed by entering them into a delay pool buffer and those heartbeats are sent within a required time.

Following a determination in step 310 that the radio (mobile device 18) is powered up the heartbeat is passed to the mobile device 18, step 330. In this manner heartbeats are not delayed if the mobile device 18 is powered up.

Following the passing of a heartbeat in step 330 a determination is made was to whether the mobile device 18 (radio) just came up, step 334. If not, operation passes back to step 306. However, if the mobile device 18 did just come up the delay pool buffer may include delayed heartbeats and the timer 322 may be running. Therefore, operation 300 flushes the delay pool buffer, step 326 and sets the timer, step 322. Appropriate timer settings may some predetermined maximum or the timer simply may be shut down until the delay pool buffer contains a delayed heartbeat.

Proper set up of the operation 300 should include knowledge of mobile device 18 decay times (how fast the radio goes to a low power state when quiet); network connection timeouts: how long before the network tears down a quiet connection; how long the client will wait for an ACK (acknowledgment) before its behavior changes; and heartbeat delay tolerances: how long the local proxy server will wait before its behavior changes. Other set up information can also be useful.

In one illustrative example, the disclosed innovation herein includes optimizations that categorize mobile transactions to (a) keep-alives, (b) other non-user-interactive traffic and (c) user-interactive traffic to facilitate management and conservation mobile traffic in mobile networks. Embodiment processes for the categorization include, for example, identifying keep-alives, in response to identifying keep-alives, identifying unnecessary keep-alives, and identifying a tolerance of delay of keep-alives and non-user-interactive traffic. Identifying keep-alives (e.g., heartbeats) may include, using the TCP streaming optimization, the local proxy and/or the proxy server can identify transactions within a TCP stream. In one or more embodiments, categorization of those transactions is provided to (a) keep-alives, (b) other non-user-interactive traffic and (c) user-interactive traffic. For example keep-alives (a) can be identified based on a combination of parameters, including, by way of example: periodicity, size thresholds, similar/repeating content, and/or based on knowledge of the actual application level protocol. (b) other non-user interactive traffic and (c) user-interactive traffic can be further distinguished from each other by proxies of user activity or a combination of status of the application performing the data transfer (e.g., foreground/background, active, non-active), status of output mechanisms, such as screen, audio, notification LED, Bluetooth, NFC, RFID, touch sensor, any other types of sensors, camera, etc, and readings from the any other sensors or detectors of the device, such as microphone, accelerometer, biosensors, location sensors, motion sensors, and the like. The method may include, in response to identifying keep-alives, identifying unnecessary keep-alives. By observing the data transfer and proxies of user activity (see 1b above) initiated by something else than user himself (e.g. by pressing the power or menu button or screen, or moving the device, to wake up the device, or otherwise interacting with the mobile device) between two keep-alives, the system (e.g., the distributed proxy system or the local proxy and/or the proxy server) can determine whether a given keep-alive is necessary or not. A keep-alive may be necessary, if there is user activity and/or non-keep-alive data for the given application and/or in the keep-alive TCP stream before the next keep-alive, as if the first keep-alive would be eliminated, the connection may not have been available for the non-keep-alive data when it was to be sent. As keep-alives themselves may carry payload data, user activity after such a keep-alive may be an indication that a keep-alive did carry payload data and was thus not necessary.

The method may include identifying tolerance of delay of (a) keep-alives and (b) other non-user-interactive traffic. Applications have varying tolerance to receiving response to the transaction that they send out. An algorithm is developed to detect such tolerance for a given combination of application/protocol/TCP/UDP port. This can be based on a mechanism of gradually increasing the delay to such combinations until the application times out (and closes the socket or is observed to retry the request), or until the application's retry interval becomes longer than a specified threshold. Additionally, based on pre-defined knowledge of importance or priority of specific content types (such as log uploads from the application that are not time critical or less time critical), we may consider to tolerate higher retry intervals, (e.g., more extensive retry intervals up to more minutes, hours, several hours or days).

One or more methods are provided herein for optimization that intelligently aligns keep-alives through delays, advancing, and/or blocking to optimize non-user interactive traffic in a mobile network for mobile traffic management. Embodiments of optimization processes or strategies include, for example:

Alignment of keep-alives (and other non-user-interactive traffic) to conserve signaling may include a first delaying instance or opportunity. For identified tolerance of a given traffic (based on (1) identifying keep-alives and (3) identifying a tolerance of delay of keep-alives and other non-user-interactive traffic), the method may include delaying the outgoing traffic. Parameters to consider in identifying different keep-alive types based on implementing the ability to delay (based on a configurable tolerance traffic which can be specified based on, for example: Foreground versus background status; Screen state; App name; Destination port; Protocol; Keep-alive (0/1) and/or Request URL.

The tolerance of delay may be based on the fact that many applications utilize libraries from the operating system in their network communications. These libraries also provide timer mechanisms, where the application can request the function to time out after, for example, 60 seconds. By modifying the library so that the timeout can be altered depending on whether the data transaction in question can be considered to be non-user-interactive, the system, such as the local proxy and/or proxy server can make the application not time out, and thus extend the delay beyond what the application requested.

Alignment of keep-alives may further include advancing the keep-alive: where synthetic keep-alive request/heartbeat can be created (based on analysis of previous real heartbeats runtime, or offline-analyzed knowledge how to construct keep-alives for a given application), the request can be sent out opportunistically earlier than the application would ordinarily send the request out, when the radio is up for other reasons. Based on observed radio-up patterns, or based on a pre-defined threshold, a threshold for advancement is defined so that keep-alives are not sent more frequently than statistically necessary. An embodiment for example, uses a radio-up opportunity to send a server a synthetic heartbeat (e.g., in addition to the synthetic ACK or choose to allow a real ACK to flow through). This can serve as a safer and cleaner approach to keeping the GCM/Server "happy" and removes the need for the connection chopping and re-connection as would occur with the current prototype. One or more embodiments provide suitably configured bounds to determine when the GCM heartbeat should be advanced. Sending a synthetic keep-alive has a downside that it may cause decoupling of application-side socket (between an application and the local proxy) from the network side socket (between local proxy on the mobile device and the proxy server) as checksums between the two sockets may not match anymore. In such case, sending the new data from the network socket to the application socket may get rejected by the application, but it will cause the application to re-establish the connection, and the servers in such case are designed to resend the failed data again—resulting in slight delay of the data, but no data loss.

One or more methods disclosed herein may include optimizing the choice of the push mechanism to be most network-friendly and blocking unnecessary keep-alives.

As it relates to optimizing the choice of the push mechanism to be most network friendly, applications maintain multiple push mechanisms (e.g., Skype TCP socket through centralized servers and peer-to-peer UDP-based mechanism, Viber, Whatsapp and LINE use their proprietary TCP-mechanism and Google Cloud Messaging (GCM). For UDP/TCP type applications, the strategy can be to block UDP traffic while user is not interacting with the application, with the reasoning that keeping peer-to-peer channels open with multiple peers is more chatty than a single server-mediated connection. That will decrease signaling in operator network, but somewhat increase delays. The increased delay is the reason why the one or more embodiments of methods and systems disclosed herein do not want to block UDP in an interactive setting.

For TCP/GCM type applications, when the application moves to the background a) the method includes blocking all client generated traffic and b) closing all server connections. Unblock when either: the application moves to the foreground, or a GCM push message is received.

The method may include, when unblocking, starting a timer. If the application stays in the background beyond a configurable timeout value, resume blocking. Blocking unnecessary keep-alives may include a process to predict whether a given keep-alive is unnecessary (as the real necessity will be known only after-the-fact). These are based on examples steps including, for example observing traffic for a learning period (either for a single device run-time, or for multiple devices centrally) and determining the factors that can be used to perform strongest prediction of necessity. One or more characteristics and factors may include user, application, time-of-the-day, day-of-the-week, screen state pattern, number of non-necessary keep-alives in the immediate past and a number of others. Based on the identified predictors, blocking specific keep-alives or the entire application (in case application attempts to perform port-hopping. Blocking specific keep-alives may include blocking either the specific port of a specific application for a specific duration, as a keep-alive would be reattempted if blocked only for the atomic keep-alive itself. The method may include observing the traffic after each blocking event, determining whether the blocking event was successful (no necessary traffic was missed) or a failure (necessary traffic was missed). This is determined, for example, by observing the initial data transfer in establishing the socket, whether the traffic pattern differs from a case where the socket is established without any pending data. The prediction can be updated based on this information.

In one or more embodiments, a response to a keep-alive sent by the application can be synthesized based on either knowledge of the earlier keep-alive responses, or by a prior knowledge of the application protocol. In such case, full blocking of the application port/full application may not be needed and responses to application can be delivered and the risk of blocking when application attempting to send out something else than the keep-alive traffic is eliminated. This technology can be implemented, for example in place for Exchange ActiveSync where it may be possible to reduce signaling due to the ExchangeActiveSync protocol. The primary functionality provides that, while the screen is off, responding to EAS Ping, Sync and FolderSync requests with EAS "no news" response. Additionally, the functionality provides that, when the screen comes on, causing the application to immediately go out to the network In one or more embodiments, the method may enable configurable intervals, for example, if the screen has been off for X seconds, causing the application to go to the network, then resume responding with "no news" until next period passes. The method may enable configurable intervals, for example, respond with "no news" for X seconds, then allow the application to go to the network for Y seconds, repeating the cycle while the screen is off. When the screen comes on, continue serving "no news" response until the mail application comes to the foreground. As it relates to Google® Cloud Messaging, the method may include, while the screen is off, responding to GCM Heartbeats with "no news." When the screen comes on, closing the connection to the GCM application in order to cause GCM to go out to the network immediately.

In general, the disclosed technique has three features of opportunistic, lazy, and local. The technique is opportunistic in that it makes use of the radio whenever it's available. The technique is lazy in that if the radio isn't available, the system waits as long as possible before bringing the radio up. The technique is local in that it generally doesn't require any information/predictions about future events or their timing.

An example process is as follows, on intercepting a heartbeat: If the radio is up, the technique passes the heartbeat through and the process is completed. Otherwise, the technique places the heartbeat in a delay pool and set a timer for the shortest time horizon in the pool (if necessary) and the process waits. Additionally, whenever the radio comes up for any reason, the technique sends out any heartbeats in the delay pool and cancels the timer. Further, when the timer fires, the technique brings up the radio and clear the pool (see C, above).

The above detailed description of embodiments of the invention is not intended to be exhaustive or to limit the teachings to the precise form disclosed. While specific embodiments of, and examples for, the disclosure are described above for illustrative purposes, various equivalent modifications are possible within the scope of the disclosure. For example, while operational steps are presented in a given order, alternative embodiments may perform such steps in a different order, some steps may be deleted, and others added.

What is claimed:

1. A method comprising:
at a mobile device:
monitoring keep-alive messages sent at varying intervals between the mobile device and a remote entity as part of one or more transactions;
determining a tolerance of delay of keep-alive messages that includes:
increasing the tolerance of delay until an application executing on the mobile device times out by increasing the tolerance of delay for a combination comprising at least two of: the application, a protocol, and a communications port communicating with the application; and
reducing the tolerance of delay after the application times out;
identifying a transaction as unnecessary when the transaction includes user-initiated data transmitting from the mobile device in addition to a keep-alive message, wherein a respective transaction includes user-initiated data when the traffic originates in response to output mechanisms of the mobile device, or when the transaction is associated with a keep-alive message that has not been sent when the application times out, wherein a timer for the application timing out is set if the application is to be delayed; and
blocking the keep-alive message for the unnecessary transaction.

2. The method of claim 1, wherein the output mechanisms of the mobile device include at least one of a display screen, audio, notification light, Bluetooth® module, NFC module, RFID module, and touch sensor.

3. The method of claim 1, further comprising determining that the respective transaction is a keep-alive based off of at least one of periodicity of transactions, size of transactions, and repetitiveness of transactions.

4. A mobile device comprising:
a processor;
a memory;
wherein the processor is processing the memory to execute the following steps:
monitoring keep-alive messages sent at varying intervals between the mobile device and a remote entity as part of one or more transactions;
determining a tolerance of delay of keep-alive messages that includes:
increasing the tolerance of delay until an application executing on the mobile device times out by increasing the tolerance of delay for a combination comprising at least two of: the application, a protocol, and a communications port communicating with the application; and
reducing the tolerance of delay after the application times out;
identifying a transaction as unnecessary when the transaction includes user-initiated data transmitting from the mobile device in addition to a keep-alive message, wherein a respective transaction includes user-initiated data when the traffic originates in response to output mechanisms of the mobile device, or when the transaction is associated with a keep-alive message that has not been sent when the application times out, wherein a timer for the application timing out is set if the application is to be delayed; and blocking the keep-alive message for the unnecessary transaction.

5. The mobile device of claim 4, wherein the output mechanisms of the mobile device include at least one of a display screen, audio, notification light, Bluetooth® module, NFC module, RFID module, and touch sensor.

6. The mobile device of claim 4, wherein the mobile device is further configured for determining that the respective transaction is a keep-alive based off of at least one of periodicity of transactions, size of transactions, and repetitiveness of transactions.

\* \* \* \* \*